United States Patent [19]
Rosheim

[11] Patent Number: 5,845,540
[45] Date of Patent: Dec. 8, 1998

[54] ROBOTIC MANIPULATOR

[75] Inventor: Mark E. Rosheim, St. Paul, Minn.

[73] Assignee: Ross-Hime Designs, Incorporated, St. Paul, Minn.

[21] Appl. No.: 936,388

[22] Filed: Sep. 25, 1997

Related U.S. Application Data

[63] Continuation of Ser. No. 497,199, Jun. 30, 1995, abandoned.

[51] Int. Cl.⁶ .................................................. G05G 11/00
[52] U.S. Cl. ................................ 74/490.05; 92/2; 414/4; 901/28
[58] Field of Search .......................... 74/490.01, 490.05; 414/4, 7, 1, 28; 901/28; 92/2

[56] References Cited

U.S. PATENT DOCUMENTS

| | | | |
|---|---|---|---|
| 2,476,249 | 7/1949 | Payne | 414/4 |
| 3,171,549 | 3/1965 | Orloff | 414/4 |
| 3,631,737 | 1/1972 | Wells | 214/1 |
| 4,046,262 | 9/1977 | Vykukal et al. | 214/1 |
| 4,068,763 | 1/1978 | Fletcher et al. | 214/1 |
| 4,338,038 | 7/1982 | Cloarec | 901/28 |
| 4,626,164 | 12/1986 | Chang | 414/735 |
| 4,641,251 | 2/1987 | Inoue | 364/513 |
| 4,683,773 | 8/1987 | Diamond | 74/479 |
| 4,736,826 | 4/1988 | White et al. | 191/12.4 |
| 4,780,047 | 10/1988 | Holt et al. | 414/730 |
| 4,821,594 | 4/1989 | Rosheim | 74/490.05 |
| 4,883,400 | 11/1989 | Kuban et al. | 414/2 |
| 4,911,033 | 3/1990 | Rosheim et al. | 74/479 |
| 5,314,425 | 5/1994 | Shpigel | 901/28 |
| 5,354,162 | 10/1994 | Burdea | 414/4 |
| 5,410,944 | 5/1995 | Cushman | 92/2 |

Primary Examiner—Richard M. Lorence
Assistant Examiner—David M. Fenstermacher
Attorney, Agent, or Firm—Kinney & Lange, P.A.

[57] ABSTRACT

A pair of connected joints is provided in a master-slave robotic system each operated by a plurality of force imparting means. Such force imparting means for the second joint supported on a member controlled by the first joint imparts force to a member controlled by the second joint at an acute angle. A third joint is used with a flexible drive tape partly internal thereto.

20 Claims, 7 Drawing Sheets

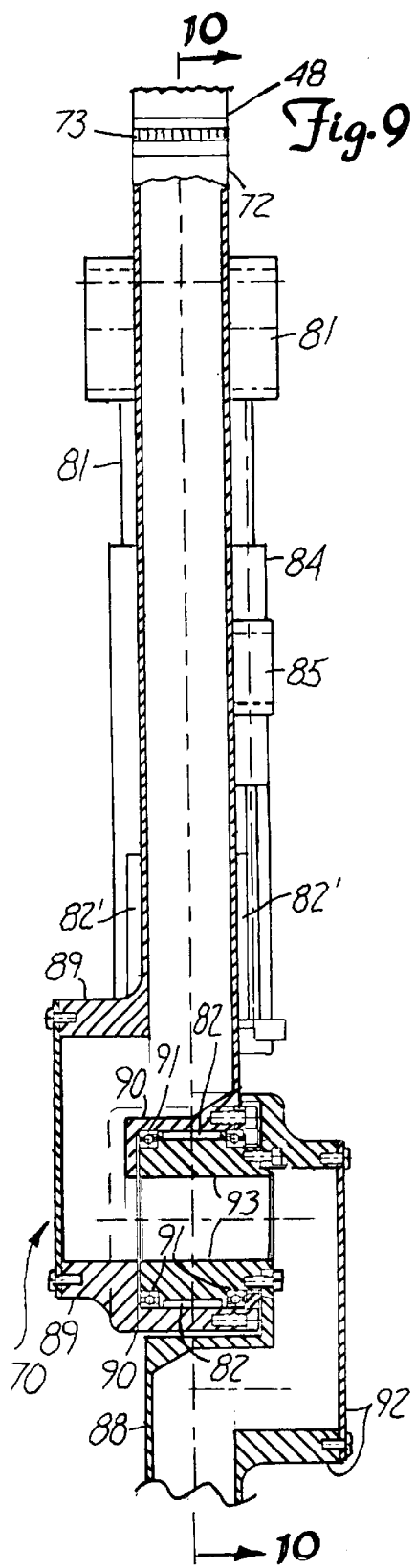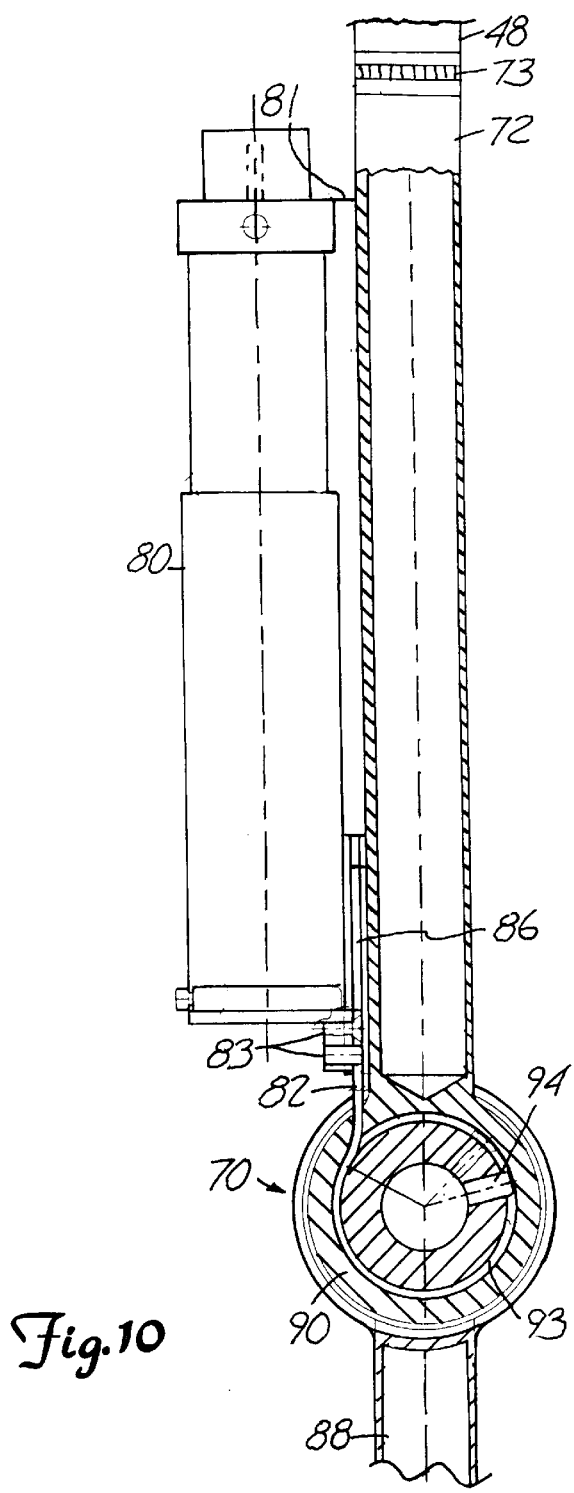

ROBOTIC MANIPULATOR

This is a continuation of application Ser. No. 08/497,199, filed Jun. 30, 1995.

BACKGROUND OF THE INVENTION

The present invention relates to controlled motion mechanical members used as a mechanical manipulator and, more particularly, to a motion controllable, anthropomorphic mechanical manipulator providing some of the capabilities of an upper human torso.

A need for increased automation in the workplace, especially in those workplace environments unsuitable for humans, and a desire to increase the use of animated figures depicting humans or other characters often in entertainment situations, has led to substantial efforts in the development of robotics. As a result, substantial advances have occurred in many aspects of robotics.

An important aspect in robotics is the controlling of mechanical manipulators, the portion of a robot used to change the position or orientation of selected objects. In many instances, such manipulators are desired to have motion capabilities similar to those of a human chest, shoulder, arm, wrist and hand, or portions thereof.

Providing a mechanical manipulator simulating such portions of the human torso presents a difficult design problem. The chest portions of a human supporting a shoulder can be considered to have two degrees-of-freedom in motion possibilities available to it, and the shoulder supporting the arm can be considered to have three degrees-of-freedom in motion possibilities available to it. In addition, the elbow can be considered to have a single degree-of-freedom in its possible motion and the wrist can be considered to have three degrees-of-freedom in motion possibilities available for it. Finally, the human palm can be considered to have a degree-of-freedom in its relative motion possibilities while the fingers and thumb thereon can be considered to have four degrees-of-freedom in the motion possibilities thereof.

A number of mechanical joints or mechanical manipulators have been proposed which attempt to exhibit the motion possibilities of the corresponding human joints, and some of these proposals have actually achieved corresponding capabilities to a significant degree. These joints typically have a base on which one side of the joint is fastened, and from which a force imparting arrangement is provided to operate movable members in this fastened portion of the joint. Mechanical transmission arrangements then couple this motion on this fastened side of the joint to the controlled side of the joint to cause that portion to correspondingly move.

However, such joints have often been constructed using a substantial number of parts causing significant expense, and with the result that they are often difficult to assemble. Further, such joints often fail to have the controlled portion thereof exhibit the desired dexterity and range of motion. In addition, the construction have often exhibited bulky geometries which do not appear much like those of the human counterparts. Also, control of the controlled side of the joint has often been insufficient in the operator not having convenient controlling arrangements available. Thus, there is desire to joint arrangements overcoming such deficiencies so that a human look-alike upper torso and arm mechanical manipulator can be provided with motion possibilities substantially equivalent to that of the upper human torso and arm.

SUMMARY OF THE INVENTION

The present invention provides a pair of connected joints and force imparting means therefor especially suitable for use in anthropomorphic master-slave robotic system. The force imparting means for the second joint imparts force thereto at an acute angle with respect to the connection between the two joints. A third joint is operated by a flexible tape passing through one joint member to operate the other.

BRIEF DESCRIPTION OF THE DRAWINGS

FIG. 9 shows a cross section view of the structure shown in FIG. 6; and

FIG. 10 shows a cross section view of the structure shown in FIG. 9.

DETAILED DESCRIPTION OF THE PREFERRED EMBODIMENTS

Figure 1:
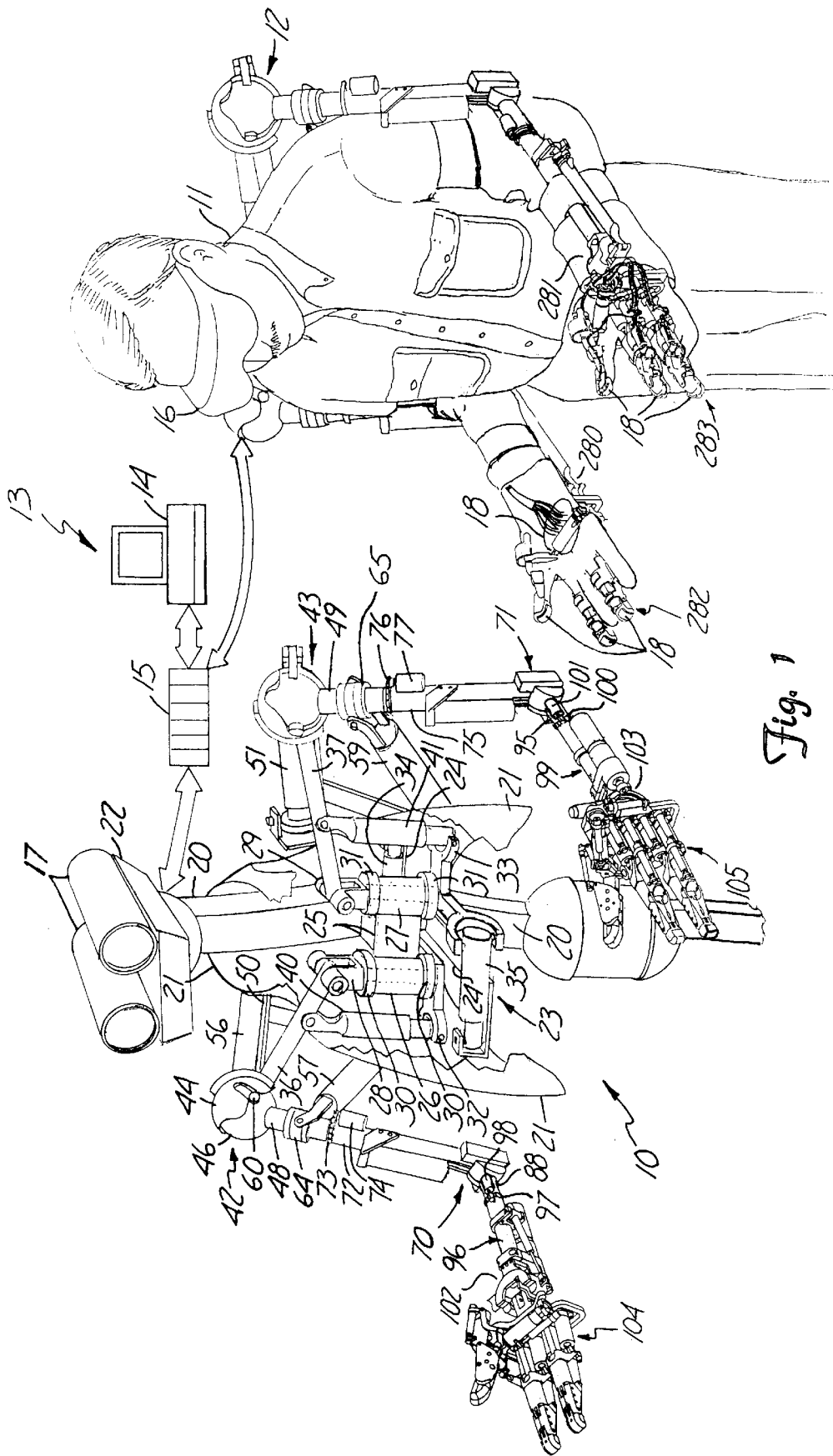
FIG. 1 shows a pictorial view of a master-slave robot and robotic control arrangement embodying the present invention.

FIG. 1 shows a master-slave robot and robotic control arrangement in which a slave robot, 10, is under the control of a human operator, 11, through having externally mounted on the upper torso, arms and hands of that operator, a master robotic control apparatus, 12. This control apparatus might be termed an "exoskeleton" in its being mounted about the exterior of the upper portion of that operator's body.

Control exoskeleton 12, in being attached to the operator's upper torso, arms and hands, senses each motion of these bodily parts of the operator and transmits signals carrying such information from a transmitter therein not seen in FIG. 1, to a control arrangement, 13. Control arrangement 13 is operated under the direction of a computer, 14, which controls operation of a system controller, 15. Operator 11, or another, can impose further control measures on the system through computer 14 such as setting system parameter values, etc. Controller 15 has a receiver therein to receive transmissions from the transmitter in control exoskeleton 12, and has a transmitter therein to send information signals to a receiver in control exoskeleton 12 also not shown.

Similarly, controller 15 has a transmitter therein to transmit information signals to a receiver in slave robot 10, again not separately shown but indicated to be in a portion of that robot somewhat reminiscent of a human head. This portion of slave robot 10 also has a transmitter therein for transmitting information signals to controller 15 which has a further receiver to receive same therein. Wiring arrangements are provided through the joints and joint connectors in both slave robot 10 and control exoskeleton 12 to distribute signals obtained from the receivers therein to the actuators therein intended to respond to them, and to collect signals from sensors therein to be brought to the transmitters therein.

Control exoskeleton 12, in receiving signals from controller arrangement 13, uses the information in those signals to operate actuators therein to aid human operator 11 in moving the exoskeleton apparatus to the extent desired by that operator. The signals received in exoskeleton 12 from control arrangement 13 are used to move the corresponding actuators therein sufficiently to null out force magnitude signals measured by force sensors thereon due to forces imposed by bodily motions of human operator 11 which force signals (and some translation magnitude signals) are transmitted to control arrangement 13. These bodily motion based force magnitude signals (and some translation magnitude signals) are also used by control arrangement 13 to cause similar motions by similar actuators in slave robot 10 through control arrangement 13 transmitting similar signals intended for those actuators to slave robot 10.

Such sensed signals from slave robot 10 to control arrangement 13 may include video signals subsequently transmitted by control arrangement 13 to a video display arrangement within a visor, 16, worn by operator 11 which convey thereto the information obtained by video cameras in slave robot 10 such as those at the top thereof designated 17. Also, the actuator signals received in control exoskeleton 12 from control arrangement 13 convey tactile force information which signals are distributed to tactile force actuators, 18, capable of applying force to operator 11 at locations in which they are provided. These locations are in the hand-like portions of control exoskeleton 12, both in the finger-like portions where the tactile actuators are built in and in a palm portion where the tactile actuators are provided in a glove fitted over the operators hand.

A basic motion to be simulated by slave robot 10 by the upper human torso movement simulation capability thereof is the ability of a human to position the shoulders with respect to the rib cage and spine of a human. That is, humans can throw their shoulders back or forward. As a basis for this simulation, slave robot 10 is provided with a human spine-like base, 20, which is seen more clearly in FIG. 2. The structure and actuators for simulating this motion are supported by base 20 and housed within a rib cage-like shroud, 21, shown partly removed in FIG. 2 to avoid obscuring structures within the interior thereof. Base 20 also supports a human head-like arrangement, 22, at its top containing control circuitry and supporting cameras 17.

This structure and these actuators for this shoulder motion simulation are provided in an interior joint arrangement, 23, that is supported on base 20 by two support structure plates, 24 and 25, affixed thereto. These plates are seen in a plan view showing a portion of the FIG. 2 structure in FIG. 3. Structure 25 supports a pair of rotary bases, 26 and 27, each rotatably supporting a spindle of one of a pair of corresponding forks, 28 and 29. The spindles of each of forks 28 and 29 can rotate within its corresponding one of rotary bases 26 and 27 along a vertical axis in FIGS. 1 and 2, i.e. along an axis extending in the general direction of spine-like structure or base 20. Rotary bases 26 and 27 support forks 28 and 29 while permitting them to rotate therein by having each corresponding fork spindle mounted in a pair of prestressed conical bearings, 30 and 31, with each of the bearing members of a pair being located on an opposite end of its corresponding one of rotary bases 26 and 27. The inner bearing races are affixed to the ends of the spindles of the forks, and the outer bearing races are affixed to the walls or rotary bases 26 and 27 at the opposite ends thereof.

The lower end of the spindle of fork 28 is fixedly attached to a bent, common shank, double clevis, 32. Similarly, the lower end of fork 29 is fixedly attached to another bent, common shank double clevis, 33. These double clevises are each driven by a corresponding linear actuator connected thereto and mounted on support structure 24. A first of these linear actuators, 34, is mounted on support structure 24 and rotatably connected in a clevis provided at one end of double clevis 32 by a pin. The other end of linear actuator 34 is connected through a pin to support structure 24 to be rotatably connected thereto. Similarly, a further linear actuator, 35, is connected by a pin to a clevis structure at an end of double clevis structure 33 to be rotatably connected thereto, and the other end of linear actuator 35 is connected by a pin to support structure 24 to be rotatably connected thereto.

The upper end of fork 28, opposite its end connected to double clevis 32, has the two branches thereof forming a forked end rotatably connected by a pin to a tubular joint support, 36. In a like manner, the upper end of fork 29, opposite its end connected to double clevis 33, has the two branches thereof forming a forked end rotatably connected through a pin to another tubular joint support, 37. The opposite end of tubular joint support 36 has affixed to it a support bracket, 38, supporting a ball-and-socket joint corresponding to a human shoulder joint as will be described below. This is also true of tubular joint support 37 which has affixed to it a further bracket, 39, to support another ball-and-socket joint again corresponding to a human shoulder joint.

Figure 3:
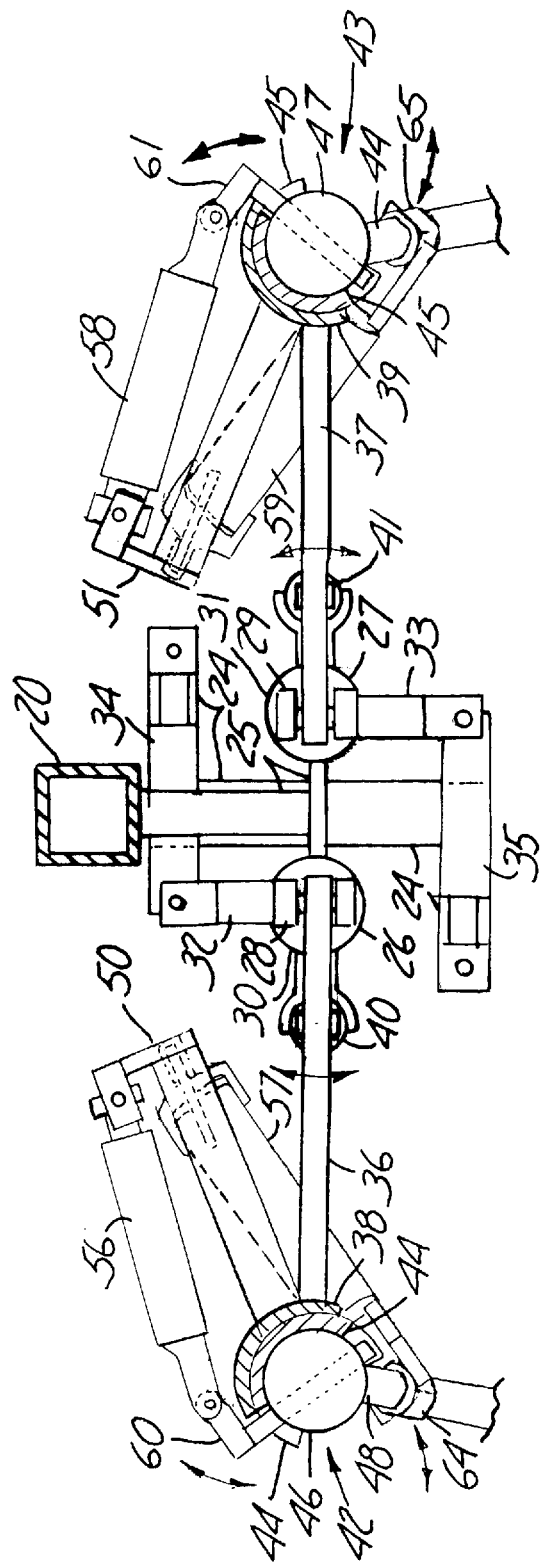
FIG. 3 shows a plan view of a portion of the structure shown in FIG. 2.

Thus, as can be seen in FIG. 3, if linear actuator 34 elongates, double clevis 32 will cause fork 28 to rotate in rotary base 26 thereby forcing tubular joint support 36 and the ball-and-socket connected thereto to rotate counterclockwise, and with rotation of the ball-and-socket joint held by bracket 38 occurring in the opposite direction for a shortening of linear actuator 34. Similarly, any elongation of linear actuator 35 will cause double clevis 33 to rotate counterclockwise to thereby force fork 29 to rotate in rotary base 27 and thus force tubular joint support 37 and bracket 39 to rotate counterclockwise along with the ball-and-socket joint connected thereto. A shortening of linear actuator 35 will produce a rotation of that latter ball-and-socket joint in the opposite direction. Thus, slave robot 10 can emulate a human throwing his or her shoulders backward or forward by operation of linear actuators 34 and 35 to operate joint arrangement 23.

Any such rotation of double clevis 32 results in moving a further linear actuator, 40, as part of the same rotation because of the rotatable connection of the other clevis in double clevis 32 to linear actuator 40. A similar result is achieved by linear actuator 35 rotating double clevis 33 to carry along in that rotation another linear actuator, 41, rotatably connected to the remaining clevis in double clevis 33. Linear actuator 40 has its opposite end rotatably connected to tubular joint support 36 at approximately a third of the length of that support away from its connection to fork 28. Linear actuator 41 is similarly connected to tubular joint support 37 at approximately a third of its length away from its connection to fork 29. Thus, operating linear actuators 40 or 41 to extend them up and down results in a motion of the corresponding ball-and-socket joint resembling shrugging motions in human shoulders.

Figure 2:
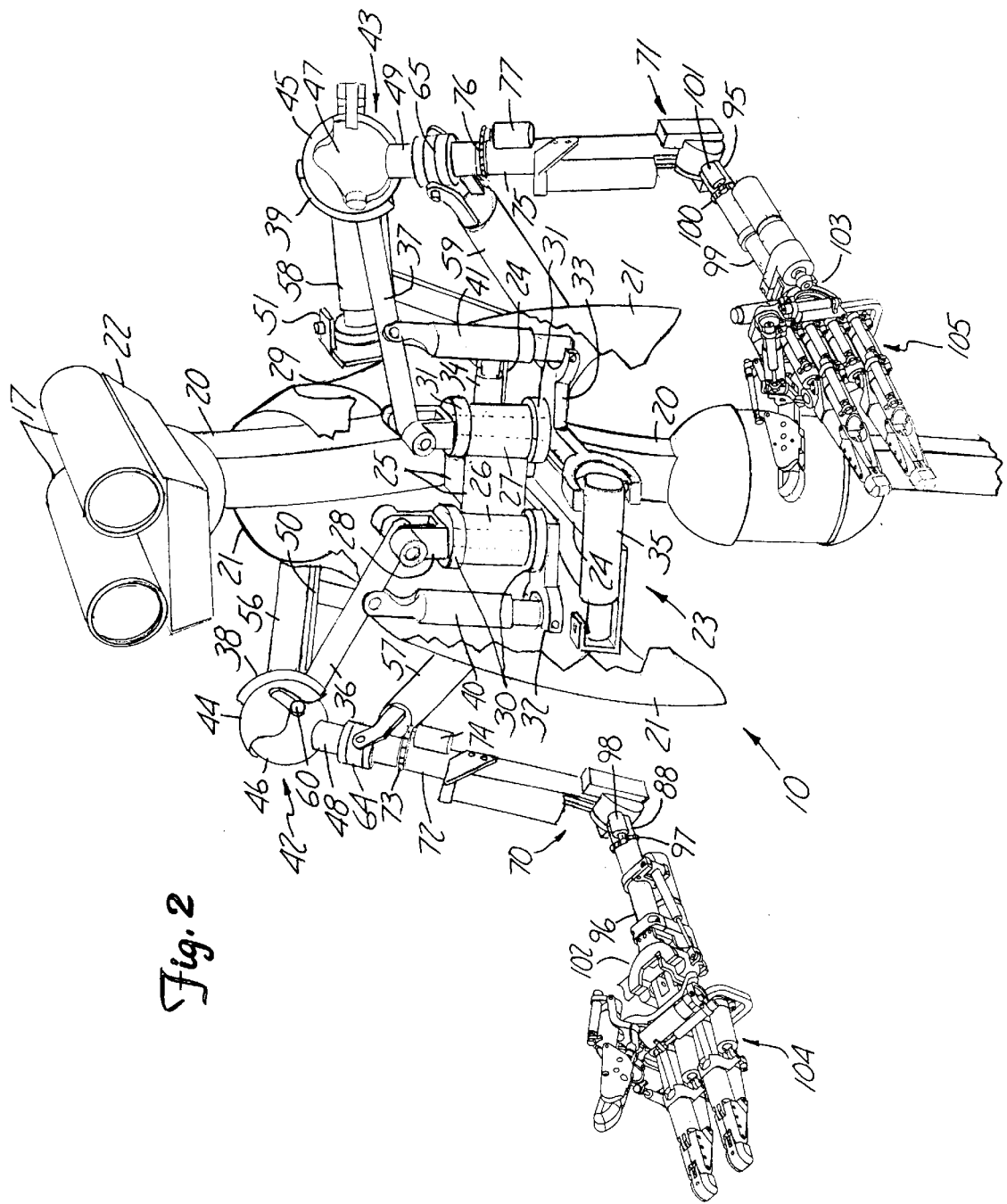
FIG. 2 shows a pictorial view of a slave robot embodying the present invention.

The arrangement used to provide the back and forth motion of the shoulder-like ball-and-socket joints affixed to brackets 38 and 39 is, as described, accomplished by the use of linear actuators as shown in FIGS. 1, 2 and 3. Such a structure results in a very "stiff" arrangement in that forces applied to tubular joints supports 36 and 37 from external sources have relatively little effect in forcing those supports to move back and forth because of the strong resistance of linear actuators 34 and 35 to changing length due to external forces. However, other and simpler arrangements can be used for shoulder motion simulation joint 23 which may not be as resistant to externally applied forces but which are either cheaper or more convenient. Thus, linear actuators 34 and 35, double devises 32 and 33, and rotary bases 26 and 27 can be dispensed with and replaced by a pair of side-by-side rotary electrical motors supported by a mount to base 20. The output shafts of these motors have forked ends connected to tubular joint supports 36 and 37 as before, and also have thereon support brackets thereon extending therefrom down the sides of the motors and then underneath linear actuators 40 and 41 to thereby support them and rotate them. Such an arrangement would again allow rotating the shoulder-like ball-and-socket joints affixed to brackets 38 and 39 to similarly simulate the motion of human shoulders thrown back and forth. Linear actuators 40 and 41 would again be able to move joint supports 36 and 37 up and down with the ball-and-socket joints thereon to simulate the shrugging motion of human shoulders.

A further alternative for shoulder motion simulation joint 23 is to mount a pair support bases on base 20 in place of rotary bases 26 and 27 again dispensing with double clevis 32 and 33 and linear actuators 34 and 35 along with support structure 24, and this time also dispensing with linear actuators 40 and 41. Using these substituted bases, one for each shoulder-like ball-and-socket joint, the joint supports 36 and 37 can each be directed outward in a sideways direction at an angle to the other and base 20, and connected to its corresponding base by an orthogonal pivot structure such as a universal joint. Two outward extending arms on each base, extending in orthogonal directions therefrom, support rotatably connected linear actuators thereon, and the other ends of these actuators are rotatably connected to the facing side of a corresponding one of joint supports 36 and 37 at approximately the midpoint thereof. Tubular joint supports 36 and 37 are again connected by brackets at the ends thereof to the corresponding ball-and-socket joints. Suitably positioning the actuators with respect to base 20 allows one actuator to move the corresponding shoulder-like ball-and-socket joint back and forth, while the orthogonally positioned actuator is allowed to move that ball-and-socket joint up and down.

The ball-and-socket joints simulating shoulder joints of a human that are provided in control exoskeleton 12 worn by operator 11 are joined, although not shown in FIG. 1, by the above described alternative version of joint 23 based on using a pair of electric motors with rotating output shafts to rotate the tubular joint supports front and back in aid of operator 11. This use of such motors in control exoskeleton 12 in a joint having the purpose of joint 23 in slave robot 10 in place of the linear actuator implementation of joint 23 in slave robot 10 shown in FIGS. 2 and 3 is made to reduce the bulkiness of that structure for the comfort of operator 11 during use. The reduced resistance to externally applied forces in such a joint in control exoskeleton 12 is not a concern of the magnitude that it is for the joint 23 arrangement shown in FIGS. 1, 2 and 3 for slave robot 10, and not of the magnitude of the concern there would be for operator 11 if forced to wear an unduly bulky exoskeleton.

As indicated above, a pair of ball-and-socket joints, 42 and 43, are provided at the end of tubular joint supports 36 and 37, respectively, to permit simulating human shoulder joints which are known to be ball-and-socket joints capable of allowing the human arm to rotate therein to thereby make that arm capable of extending in a plurality of directions as can be seen in FIGS. 2 and 3. Ball-and-socket joint 42 is supported by being affixed to bracket 38 which itself is affixed to the end of tubular joint support 36. In a like matter, ball-and-socket joint 43 is supported by bracket 39 affixed thereto and to the end of tubular joint support 37. Specifically, bracket 38 is affixed by screws to a socket, 44, in joint 42. Bracket 39 is also affixed by screws to a socket, 45, in joint 43. This can be more clearly seen in FIG. 4 for joint 42 which is a cross section view of that joint.

Within socket 44, is a substantially hollow ball, 46. Similarly, within socket 45 of joint 43 is a substantially hollow ball, 47. Hollow balls 46 and 47 can rotate about their centers within sockets 44 and 45, respectfully, to a considerable but limited extent by sliding along the interiors surfaces thereof. The limits to such rotation is provided by various protrusions from the balls (to be described below) encountering the terminating edges of sockets 44 and 45. As one such protrusion, hollow ball 46 has affixed thereto a tubular ball extension, 48. This is accomplished in a manner such that a open passageway through this joint exists extending through tubular joint structure 36, through openings in bracket 38 and socket 44, through hollow ball 46, and then out therefrom through tubular ball extension structure 48. This passageway permits electrical wiring to be brought from out of base 20 into the closest end of tubular joint support 36 and out the other end through bracket 38 and ball-and-socket joint 42 into tubular ball extension structure 48. Such wiring is used for controlling further actuators outward therefrom into the remaining structure connected thereto for simulating the human arm, and for collecting sensor information signals generated in such remaining structure.

A similar ball extension structure, 49, extends from hollow ball 47 forming a protrusion from that ball. A similar open passageway for wiring is thus provided is provided for joint 43 extending from the interior of tubular joint support 37, through bracket 39 and socket 45 into hollow ball 47, and then out through tubular ball extension 49. Again, such wiring is used for controlling further actuators outward therefrom into the remaining structure connected thereto for simulating the human arm, and for collecting sensor information signals generated in such remaining structure Motions of ball extensions 48 and 49 are controlled for each by a corresponding pair of actuators mounted on an actuator support bracket. These support brackets are provided at an acute angle with respect to corresponding ones of joints support 36 and 37 such that the orientation of the long direction in these brackets lies more or less along a corresponding axis between it's associated ball-and-socket joint and spine-like structure, or base, 20. This angular arrangement has the effect of keeping the brackets and the pair of actuators supported thereby relatively close into the remaining torso structure of slave robot 10 to more easily enable a shroud thereabout to simulate a human rib cage.

Ball-and-socket joint 42 has such an actuator support bracket 50, affixed to bracket 38 shown to extend back therefrom in FIG. 3 at an angle of approximately 25° with respect to tubular joint support 36 in that figure. Similarly, an actuator bracket, 51, is shown in FIG. 3 for ball-and-socket joint 43 extending back from bracket 39 to which it is affixed at a angle of approximately 25° with respect to tubular joint support 37. The selection of the value for this angle is based on a tradeoff between keeping the angle small to thereby improve compactness of the structure for slave robot 10, on the one hand, but having the angle large on the other hand so that the actuators supported thereby, generally aligned the major length of the support bracket therefor, retain the capability to force ball extensions 48 and 49 to rotate forward and back perpendicular to the corresponding tubular joint support for that ball-and-socket joint, i.e. to rotate about an axis substantially parallel to the direction of extension of those joint supports. Even more demanding in some situations, such rotations may be required to be directed to some degree inward toward the side of slave robot 10 at which the other ball-and-socket joint is located. The angular range of permitted choices for values of the angular relationships between the actuator support bracket and the tubular joint support in the plane of FIG. 3 is 15° to 75° depending on the strength of the structure, the force which can be generated by the actuator for the ball-and-socket joint responsible for moving tubular extension 48 or 49, and the expected load.

Figure 5:
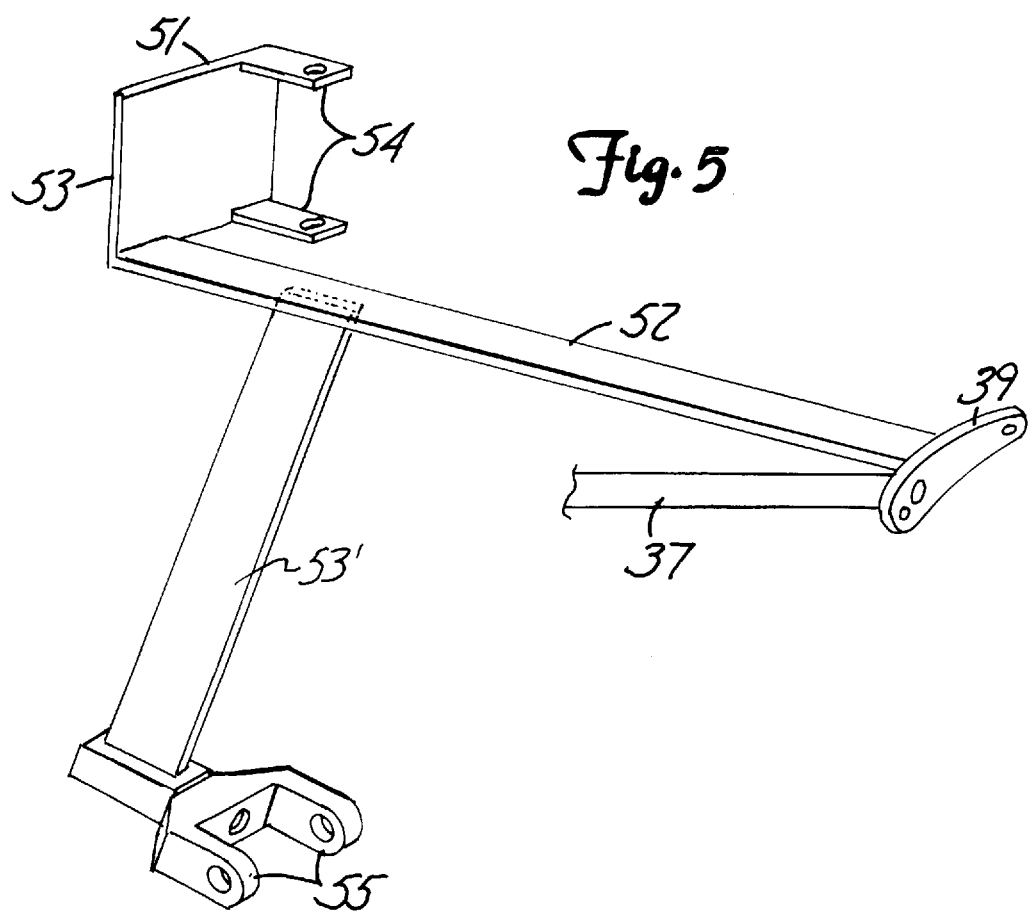
FIG. 5 shows a pictorial view of a portion of the structure shown in FIGS. 2 and 3.

Actuator support bracket 51 is shown in greater detail in FIG. 5 where it can be seen that bracket 39 has both tubular joint support 37 and ball-and-socket joint actuator support bracket 51 affixed thereto. The portion of ball-and-socket joint actuator support bracket 51 affixed to bracket 39 is a long flat bar, 52, which has a clevis support plate, 53, affixed to the other end thereof. Clevis support plate 53 has a pair of branches, 54, forming a basis for a fixed position clevis affixed thereto. In addition, a further clevis support, 53', affixed to bar 52 approximately a quarter of the distance therealong from clevis support plate 53 and approximately two thirds of its length, has rotatably connected to the opposite end thereof a more or less "U" shaped pair of branches and base, 55, forming the basis of a rotatably connected clevis.

Ball-and-socket joint actuator support bracket 50 in FIGS. 2 and 3 has a pair of linear actuators, 56 and 57, rotatably connected in the devises of that bracket. Linear actuator 56 is rotatably connected at a end thereof to the fixed position clevis of bracket 50, and linear actuator 57 is rotatably connected at a end thereof to the rotatably connected clevis of bracket 50. The length of support plate 53' and the connection point of linear actuator 57 to ball extension 48 (to be described below) results in linear actuator 57 having an axis that in elevation makes an acute angle with the axis of linear actuator 56 to allow actuator 57 to apply more of the force generated thereby to ball extension 48 in forcing it to extend forward and retract backward. That angle seen in elevation should range from 15° to 75° to assure adequate force. Similarly, ball-and-socket joint actuator support bracket 51 has a further pair of linear actuators, 58 and 59, rotatably connected to the devises therein in a similar arrangement. Linear actuator 58 has one end thereof rotatably connected to fixed clevis 54 of bracket 51, and linear actuator 59 has one end thereof rotatably connected to rotatably connected clevis 55 of bracket 51.

Figure 4:
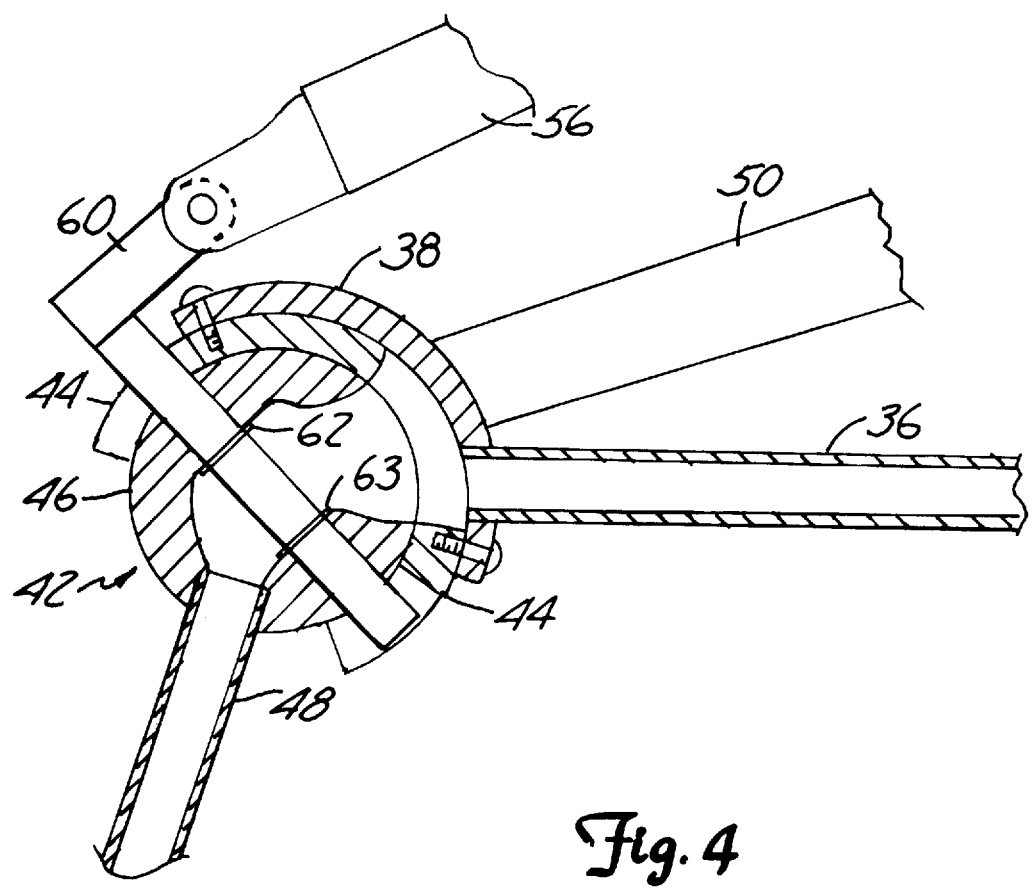
FIG. 4 shows a cross section view of a portion of the structure shown in FIGS. 2 and 3.

Linear actuator 56 is rotatably connected at an end thereof, opposite the one connected to bracket 50, to a bent pin, 60. Pin 60 is bent to approximately a right angle and has the portion thereof past the bend away from its connection to linear actuator 56 extending through slots in socket 44 on opposite sides thereof and through the outer wall of ball 46 twice on opposite sides thereof. As can be seen in FIG. 4, the portion of bent pin 60 extending through ball 46 and through corresponding slots in socket 44 extends through the center of ball 46. The presence of the portion of bent pin 60 past the bend extending through ball 46, but captured in the slots in socket 44, prevents ball 46 from rotations along an axis through the center thereof other than parallel to the axis of that portion of pin 60. Yet, ball 46 can rotate about the axis of the portion of pin 60 therethrough thus allowing tubular ball extension 48 to rotate more or less in and out of the plane of the drawing in FIG. 4 but preventing twisting of that extension about other axes in the plane of that figure. Furthermore, extensions and retractions of linear actuator 56 rotate ball 46 about an axis perpendicular to the plane of FIG. 4 to thus guide the angular orientation of tubular ball extension 48 with respect to tubular joint support 36. This orientation will determine the direction towards which tubular ball support 48 is pointing with respect to tubular joint support 36 when extension 48 is forced up from or into the plane of FIG. 4 by linear actuator 57 to be described below.

A similar bent pin, 61, is rotatably connected to the end of linear actuator 58 opposite that end thereof which is connected to bracket 51, and the portion of bent pin 61 past the bend extends through slots in socket 45 and through the wall of ball 47 twice in a manner similar to bent pin 60. Note in FIG. 4 that bent pin 60 is retained in ball 46 by a pair of retaining rings, 62 and 63, positioned against the walls of ball 46. A similar arrangement is used to retain bent pin 61 in ball 47.

The end of linear actuator 57 not connected to the rotatable clevis in bracket 50 is connected to tubular ball extension 48 through a slip ring arrangement, 64. Slip ring arrangement 64 has an inner bearing race affixed to tubular ball extension 48. An outer bearing race is rotatably connected by pins to a pair of arms extending from linear actuator 57. Needle bearings are used between the inner and outer races of slip ring 64. A similar slip ring, 65, is provided about tubular ball extension 49 for the rotatable connection of linear actuator 59 thereto. The extensions and contractions of linear actuators 57 or 59 force tubular ball extensions 48 or 49 toward or away from the rotatably connected devises of the corresponding ones of actuator brackets 50 and 51 to thus simulate the motion of a human arm being extended or retracted. The orientation of that extension, is described above, is controlled by linear actuators 56 and 58 in orienting the axis of bent pin 60 and 61, respectfully, to orient the location of corresponding balls 46 and 47.

Below tubular ball extensions 48 and 49 are the structures used to simulate motion of a human forearm about the elbow. The human elbows are simulated by single degree-of-freedom joints in slave robot 10, such a single degree-of-freedom joint, 70, being supported by tubular ball extension 48. Tubular ball extension 49 supports a similar single degree-of-freedom joint, 71. Tubular ball extension 48 supports joint 70 by supporting a tubular joint base, 72, rotatably attached thereto through a pair of bearings having inner races attached to tubular joint base 72 and outer races attached to tubular ball extension 48 which cannot be seen in the drawings. The bottom of tubular ball extension 48 has therearound a set of gear teeth, 73. A motor, 74, affixed to tubular joint base 72 forces that base and motor 74 to rotate within tubular ball extension 48 in the bearings just described through a gear on the output shaft thereof engaged with gear 73. Thus, single degree-of-freedom joint 70 and the apparatus there beyond can be caused to rotate with respect to tubular ball extension 48.

A similar structure is provided in connection with tubular ball extension 49 and single degree-of-freedom joint 71. Tubular ball extension 49 supports a tubular joint base, 75, through a pair of bearings between them not seen in the figures in the same arrangement as used in connection with tubular ball extension 48 and tubular joint base 72. The end of tubular ball extension 49 has a gear therearound, 76, and tubular joint base 75 can be rotated within tubular ball extension 49 and the bearings just mentioned by a motor, 77, through a gear on the output shaft thereof engaged with gear 76.

Figure 6:
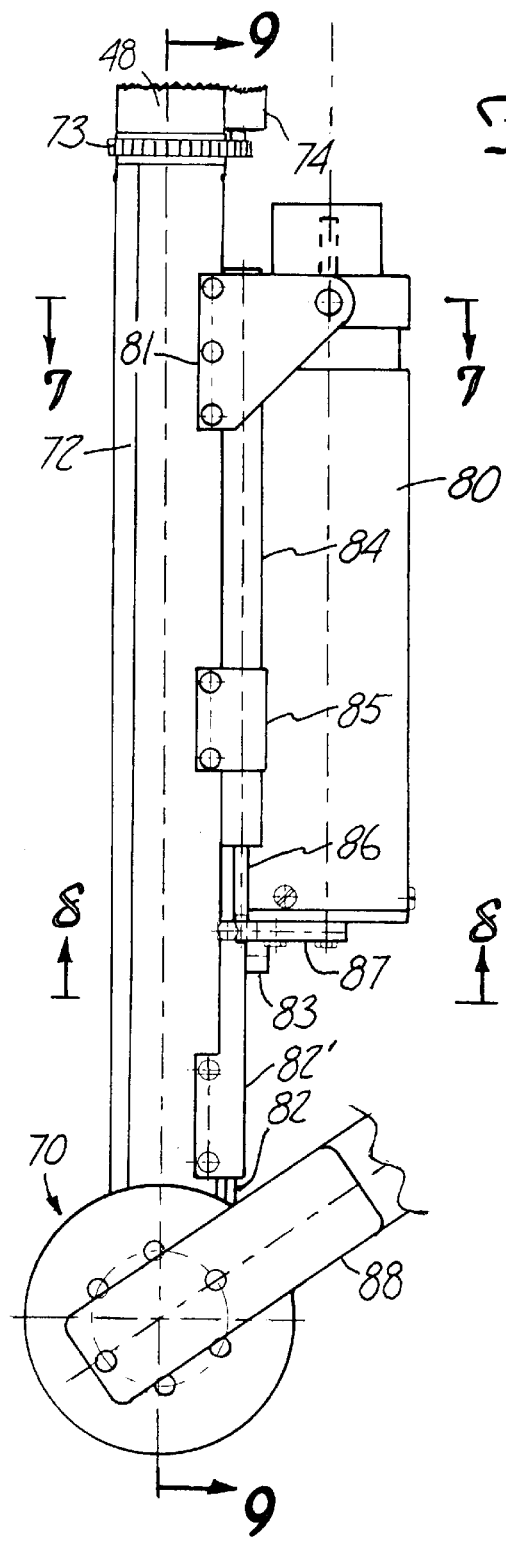
FIG. 6 shows an elevational view of a portion of the structure shown in FIG. 2.
Figure 8:
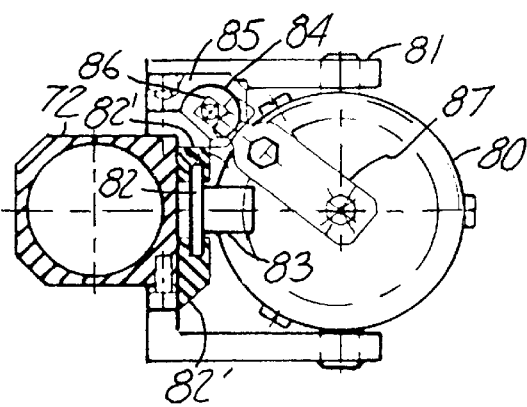
FIG. 8 shows a cross section view of the structure shown in FIG. 6.
Figure 7:
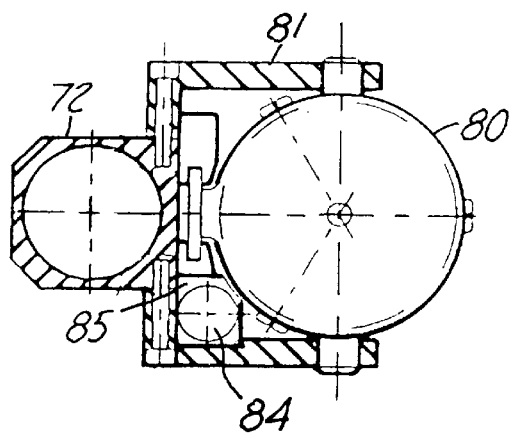
FIG. 7 shows a cross section view of the structure shown in FIG. 6.

FIG. 6 shows more detail in a selected one of joints 70 and 71, here joint 70. As can be seen, a linear actuator, 80, is used to force the side of joint 70 opposite tubular joint base 72 into motions relative to that base. Linear actuator 80 is rotatably connected at one end thereof to a bracket, 81, which is mounted on tubular joint base 72 as can be more easily seen in the cross section view of FIG. 7. The opposite end of linear actuator 80 is connected to a flexible mechanical drive tape, 82, guided in a pair of tape guides, 82', by a tape connector, 83, mounted on that end of actuator 80 which can be better seen in the cross section view of FIG. 8. A linear variable displacement transformer, 84, is held by a bracket, 85, to tubular joint base 72, and has its movable core, 86, connected by a connector, 87, to the same end of actuator 80 as is tape 82.

A joint extension, 88, shown in FIG. 6 is subject to being rotated both clockwise and counterclockwise in the view of that figure about a end portion of tubular joint base 72 opposite that end thereof engaged with tubular ball extension 48 in accord with the single degree-of-freedom permitted joint 70. The bearing arrangement to allow such rotation of joint extension 88 is best seen in FIG. 9 where it can be seen that tubular joint base 72 expands at the rotational axis location of joint 70 to form on one side thereof a cup-like portion 89 (in which there is provided a removable plate to permit external access) supporting a portion of and enclosing, except for a side facing away from the rest of the cup, a circular bearing holder band, 90, with an open interior space. A pair of thin section angular contact bearings, 91, are fitted within the circular open interior space provided by bearing position band 90 on opposite sides of that band with the bearing outer races connected to the inner surface of this band.

Joint extension 88 also expands in the portion thereof at the rotational axis of joint 70 by forming a rectangular space a rectangular offset tub, 92, which has extending from the wall thereof farthest from the remainder of extension 88 within the rectangular space a truncated cylindrical shell, 93. Truncated cylindrical shell 93 has an outer diameter to permit it to fit within the circular open interior space of bearing holder band 90 of tubular joint base 72, and within bearings 91, so that the inner race of these bearings is connected to the outer surface of truncated cylindrical shell 93 so as to enable this shell to rotate within bearing holder band 90.

Joint extension 88 is driven in and out of the plane of FIG. 9 by mechanical drive tape 82 being fastened about the outer surface of truncated cylindrical shell 93 of that extension between the pair of bearings 91 to thereby be subject to being rotationally moved by movements of linear actuator 80 forcing that tape to correspondingly move. Mechanical drive tape 82 is fastened to the outer surface of truncated cylindrical shell 93 by pin, 94, seen in the cross section view of FIG. 10. There, mechanical drive tape 82 can be seen to pass through a slot in cup-like portion 89 of tubular joint base 72 to be wrapped around and pinned to the outer surface of truncated cylinder 93.

Thus, movement of linear actuator 80 in FIG. 10, thereby forcing upward the end of tape 82 connected to it, will lead to clockwise motion of joint extension 88, and downward motion of linear actuator 80 will lead to counterclockwise motion of joint extension 88. This is possible because mechanical drive tape 82 is a rugged but flexible polymer material designed for such service and sold under the trademark DYMETROL®. An advantageous result of using such a mechanical tape drive to transmit movement force to joint extension 88 from linear actuator 80 is the providing of an open passageway through the interior of the tubular joint base 72, through it's cup-like region 89, and then through truncated cylinder 93 and rectangular offset portion 92 of joint extension 88. This again is allows wiring to be passed therethrough and on to further locations in the apparatus of slave robot 10 beyond joint 70.

Although the present invention has been described with reference to preferred embodiments, workers skilled in the art will recognize that changes may be made in form and detail without departing from the spirit and scope of the invention.

What is claimed is:

1. A controlled relative motion system permitting a controlled motion member, joined to a base member, to selectively move with respect to that base member, said system comprising:

a first joint connected to said base member and having a first joint extension extending along a first extension axis with a support end such that said first joint extension support end can be selectively moved with respect to said base anywhere over a selected range;

a plurality of first joint force imparting means connected to said first joint so as to be capable of imparting force thereto to thereby cause selected movement of said first joint extension support end;

a second joint connected to said first joint extension adjacent said support end thereof and having a second joint extension with a support end such that said second joint extension support end can be selectively moved relative to said first joint extension support end anywhere over a selected range;

an actuator support connected to said first joint extension; and a plurality of second joint force imparting means connected to said actuator support and to said second joint so as to be capable of imparting force thereto to selectively cause angular rotation by said second joint extension about a first rotation axis in an angular range limited by interference with said first joint extension and about another rotation axis substantially perpendicular to a plane having a selected angular relationship with said first rotation axis to thereby cause selected movement of said second joint extension support end with said interference preventing said second joint extension from being rotated in a plane including said first rotation axis.

2. The apparatus of claim 1 wherein said second joint comprises a ball means of a generally spherical shape about a center thereof and an equatorial plane capture means having a rotation location in which said second joint ball means is positioned such that said second joint equatorial plane capture means can rotate in multiple directions about said second joint ball means.

3. The apparatus of claim 2 wherein said second joint equatorial plane capture means is affixed to said first joint extension support end.

4. The apparatus of claim 3 in which an orientation pin extends through said second joint ball means including said center thereof, and through slots in said second joint equatorial plane capture means.

5. The apparatus of claim 2 wherein said actuator support is affixed to said first joint extension adjacent said support end thereof so as to have that portion of said actuator support so connected to said first joint extension making an acute angle therewith.

6. The apparatus of claim 5 wherein axes of said linear actuator means are at an acute angle with respect to one another viewed perpendicularly from a plane intersecting each.

7. The apparatus of claim 6 wherein a linear actuator extends between said rotary connection means and said first joint extension.

8. The apparatus of claim 1 wherein said plurality of second joint force imparting means includes a second joint first force imparting means and a second joint second force imparting means with each being a linear actuator means.

9. The apparatus of claim 8 wherein said first joint is rotatably connected to said base by a rotary connection means, and wherein said first joint extension is also connected to said rotary connection means by a rotary connection.

10. The apparatus of claim 8 wherein said first joint is rotatably connected to said base by a rotary connection means, and at least one of said first joint imparting means is connected between said rotary connection means and said base so as to be capable of rotating said first joint with respect to said base.

11. The apparatus of claim 1 wherein said first joint is connected to said base so as to be rotatable with respect thereto.

12. A controlled relative motion system permitting a pair of members joined together to selectively move with respect to one another, said system comprising:

a first joint member having a closed band portion about a circular opening therein at a rotation end thereof with said circular opening having a axis at an angle with respect to an axis of an extension portion thereof extending from said rotation end;

a second joint member having a truncated cylindrical shell in an insertion end thereof with an opening through said truncated cylindrical shell having an axis at an angle with respect to an extension portion thereof extending from said insertion end;

a bearing means disposed inside said closed band of said first joint member about said opening therein, and with said second joint member truncated cylindrical shell positioned inside said bearing means and said closed band of said first joint member;

a flexible tape passing through an opening in said first joint member in said rotation end thereof and wrapped about an outer surface of said truncated cylindrical shell of said second joint member and fastened thereto; and an actuator connected between said first joint member extension and said tape.

13. Apparatus of claim 12 wherein said first joint member extension has an interior opening therein which joins with said opening within said closed band, and wherein said second joint member extension has an interior opening therein which joins with said interior of said truncated cylindrical shell.

14. Apparatus of claim 12 wherein said actuator is a linear actuator.

15. A controlled relative motion system permitting a controlled motion member, joined to a base member, to selectively move with respect to that base member, said system comprising:

a first joint connected to said base member and having a first joint extension with a support end such that said first joint extension support end can be selectively moved with respect to said base anywhere over a selected range;

a plurality of first joint force imparting means connected to said first joint so as to be capable of imparting force thereto to thereby cause selected movement of said first joint extension support end;

a second joint connected to said first joint extension adjacent said support end thereof and having a second joint extension with a support end such that said second joint extension support end can be selectively moved relative to said first joint extension support end anywhere over a selected range;

an actuator support connected at a first location thereon to said first joint extension; and a plurality of second joint force imparting means connected to said second joint including a second joint first force imparting means connected to said actuator support at a second location thereon which is spaced substantially farther from said second joint than is said first location on said actuator support.

16. The apparatus of claim 15 wherein said second joint comprises a ball means of a generally spherical shape about a center thereof and an equatorial plane capture means having a rotation location in which said second joint ball means is positioned such that said second joint equatorial plane capture means can rotate in multiple directions about said second joint ball means.

17. The apparatus of claim 16 wherein said second joint equatorial plane capture means is affixed to said first joint extension support end.

18. The apparatus of claim 15 wherein said first joint is connected to said base so as to be rotatable with respect thereto.

19. The apparatus of claim 18 wherein axes of said linear actuator means are at an acute angle with respect to one another viewed perpendicularly from a plane intersecting each.

20. The apparatus of claim 15 wherein said plurality of second joint force imparting means includes said second joint first force imparting means and a second joint second force imparting means with each being a linear actuator means.

* * * * *

UNITED STATES PATENT AND TRADEMARK OFFICE
CERTIFICATE OF CORRECTION

PATENT NO. : 5,845,540
DATED : DECEMBER 8, 1998
INVENTOR(S) : MARK E. ROSHEIM

It is certified that error appears in the above-identified patent and that said Letters Patent is hereby corrected as shown below:

Col. 5, line 7, delete "devises", insert --clevises--.

Col. 7, line 33, delete "devises", insert --clevises--

Col. 7, line 47, delete "devises", insert --clevises--

Col. 8, line 32, delete "devises", insert --clevises--

Signed and Sealed this

Twelfth Day of October, 1999

Q. TODD DICKINSON

*Attest:*

*Attesting Officer*          Acting Commissioner of Patents and Trademarks